United States Patent [19]
Gessler, II et al.

[11] Patent Number: 5,562,749
[45] Date of Patent: Oct. 8, 1996

[54] METHOD OF PRODUCING FLAT GLASS

[76] Inventors: Herbert A. Gessler, II, 439 Church Hill Rd., Venetia, Pa. 15367; Herbert A. Gessler, 101 Lexington Dr., Lawrence, Pa. 15055; Matthew A. Gessler, 252 Papp Rd., Canonsburg, Pa. 15317

[21] Appl. No.: 386,947

[22] Filed: Feb. 10, 1995

Related U.S. Application Data

[60] Division of Ser. No. 186,628, Jan. 26, 1994, Pat. No. 5,427,598, which is a continuation-in-part of Ser. No. 920,399, Jul. 27, 1992, Pat. No. 5,302,177.

[51] Int. Cl.$^6$ .................................................. C03B 18/02
[52] U.S. Cl. .......................................... 65/99.2; 65/182.1
[58] Field of Search .......................... 65/27, 29.1, 29.11, 65/83, 85, 95, 99.2, 137, 162, 182.1, 182.3, 348, 351, 374.13, DIG. 13

[56] References Cited

U.S. PATENT DOCUMENTS

| | | | |
|---|---|---|---|
| 1,564,240 | 12/1925 | Hitchcock | 65/182.3 |
| 1,864,087 | 6/1932 | Moomaw | 432/55 |
| 2,004,916 | 6/1935 | Fitch | 432/71 |
| 3,083,551 | 4/1963 | Pilkington | 65/182.4 |
| 3,332,763 | 7/1967 | Basler et al. | 65/32.5 |
| 3,437,327 | 4/1969 | Day et al. | 432/238 |
| 3,486,869 | 12/1969 | Alonzo et al. | 65/27 |
| 3,520,669 | 7/1970 | Greenler et al. | 65/27 |
| 3,520,670 | 7/1970 | Schlehr | 65/27 |
| 3,594,147 | 7/1971 | Galey et al. | 65/182.5 |
| 3,594,148 | 7/1971 | Smith et al. | 65/182.5 |
| 3,630,701 | 12/1971 | Javaux et al. | 65/27 |
| 3,633,886 | 1/1972 | Froberg | 432/161 |
| 3,633,890 | 1/1972 | Kozmin | 432/248 |
| 4,336,086 | 7/1982 | Rast | 432/248 |
| 4,339,262 | 7/1982 | Liepelt | 65/182.1 |
| 4,340,412 | 7/1982 | May | 65/182.1 |
| 4,380,463 | 4/1983 | Matesa | 65/182.1 |
| 4,497,628 | 2/1985 | Blanchet et al. | 70/312 |
| 4,622,059 | 11/1986 | Brown | 65/160 |
| 4,752,212 | 6/1988 | Breen | 431/215 |
| 5,302,177 | 4/1994 | Gessler, II et al. | 65/162 |

FOREIGN PATENT DOCUMENTS

| | | | |
|---|---|---|---|
| 3323355 | 2/1984 | Germany | 432/248 |
| 2070748 | 9/1981 | United Kingdom | 432/248 |
| 2113816 | 8/1983 | United Kingdom | 432/248 |

OTHER PUBLICATIONS

Handbook of Glass Manufacture, vol. 11, 3rd Ed., pp. 714-2 Through 714-21.
The Glass Industry Magazine, 1980 Apr. Issue, pp. 18, 20, 22, Article "Float Glass Production: Pilkington vs. PPG", by R. A. McCauley, Rutgers University.
A Review Lecture, "The Float Glass Process" by L. A. B. Pilkington, Delivered Feb. 13, 1949.
Brochure "When NiCr Can't Carry The Load and SiC Can't Take The Abuse", Kanthal Furnace Products, 1991.
J. O. Olsson and C. Popilowski, "New And Improved High Temperature FeCrAl Alloy For Radiant Tubes", Aug. 1991.

*Primary Examiner*—Donald E. Czaja
*Assistant Examiner*—Steven P. Griffin
*Attorney, Agent, or Firm*—Buchanan Ingersoll, P.C.; George Raynovich, Jr.

[57] ABSTRACT

A method of producing flat glass is provided. Molten glass is introduced into a chamber in which a molten tin float bath is housed. The molten glass floats on top of the molten tin as it cools. A plurality of recuperative gas burners are positioned above the molten tin float bath. The recuperative gas burners are totally enclosed and the gas inlets, air inlets and exhaust gas outlets of the burners are all positioned outside the chamber containing the molten tin float bath so that the molten tin and glass within the chamber is protected from contamination by gas and air entering the gas inlets and from exhaust gases exiting through the exhaust gas outlets.

5 Claims, 11 Drawing Sheets

| HEATING CONVERSION CHART ||||||||||
|---|---|---|---|---|---|---|---|---|---|
| EXIS ELEC HEAT'G ELEMENTS |||| PROPOSED GAS BURNERS ||||||
| ZONE | CONN KW | QTY | BTU'S | ZONE | BTU'S | QTY | LENGTH | DIS RATE | BURNER BTU'S | TOTAL BTU'S |
| 1' | 75 | 20 | 255900 | 1 | 639750 | 7 | 72 | 90 | 132000 | 924000 |
| 2' | 71.25 | 19 | 243105 ||||||||
| 3' | 82.5 | 22 | 281490 ||||||||
| 4' | 71.25 | 19 | 243105 | 2 | 639750 | 7 | 72 | 90 | 132000 | 924000 |
| 5' | 75 | 20 | 255900 ||||||||
| 6' | 75 | 20 | 255900 | 3 | 511800 | 6 | 72 | 84 | 122000 | 732000 |
| 7' | 75 | 20 | 255900 ||||||||
| 8' | 75 | 20 | 255900 | 4 | 511800 | 6 | 72 | 84 | 122000 | 732000 |
| 9' | 75 | 20 | 255900 ||||||||
| 10' | 75 | 20 | 255900 | 5 | 511800 | 6 | 72 | 84 | 122000 | 732000 |
| 11' | 75 | 20 | 255900 ||||||||
| 12' | 75 | 20 | 255900 | 6 | 511800 | 6 | 72 | 84 | 122000 | 732000 |
| 13' | 75 | 20 | 255900 ||||||||
| 14' | 75 | 20 | 255900 | 7 | 255900 | 4 | 42 | 110 | 92000 | 368000 |
| 15' | 75 | 20 | 255900 | 8 | 255900 | 4 | 42 | 110 | 92000 | 368000 |
| 16' | 75 | 20 | 255900 | 9 | 255900 | 4 | 42 | 110 | 92000 | 368000 |
| 17' | 75 | 20 | 255900 | 10 | 255900 | 4 | 42 | 110 | 92000 | 368000 |
| 18' | 75 | 20 | 255900 | 11 | 255900 | 4 | 42 | 110 | 92000 | 368000 |
| 19' | 75 | 20 | 255900 | 12 | 255900 | 4 | 42 | 110 | 92000 | 368000 |
| 20' | 75 | 20 | 255900 | 13 | 255900 | 4 | 42 | 110 | 92000 | 368000 |
| 21' | 75 | 20 | 255900 | 14 | 255900 | 4 | 42 | 110 | 92000 | 368000 |
| 22' | 75 | 20 | 255900 | 15 | 255900 | 4 | 42 | 110 | 92000 | 368000 |
| 23' | 75 | 20 | 255900 | 16 | 255900 | 4 | 42 | 110 | 92000 | 368000 |
| 24' | 75 | 20 | 255900 | 17 | 255900 | 4 | 42 | 110 | 92000 | 368000 |
| 25' | 75 | 20 | 255900 | 18 | 255900 | 4 | 42 | 110 | 92000 | 368000 |
| 26' | 75 | 20 | 255900 | 19 | 255900 | 4 | 42 | 110 | 92000 | 368000 |
| 27' | 75 | 20 | 255900 | 20 | 255900 | 4 | 42 | 110 | 92000 | 368000 |
| 28' | 75 | 20 | 255900 | 21 | 255900 | 4 | 42 | 110 | 92000 | 368000 |
| 29' | 75 | 20 | 255900 | 22 | 255900 | 4 | 42 | 110 | 92000 | 368000 |
| 30' | 175 | 47 | 597000 | 23 | 853000 | 8 | 72 | 105 | 153000 | 1224000 |
| 31' | 150 | 40 | 512000 ||||||||
| 32' | 175 | 47 | 597000 | 24 | 853000 | 8 | 72 | 105 | 153000 | 1224000 |
| TOTALS | 2675 | 714 | 9,127,100 ||| 118 |||| 13,112,000 |

FIGURE 11

BATH OPERATION
COST COMPARISON CHART

| ELECTRICITY | NATURAL GAS |
|---|---|
| TOTAL CONNECTED LOAD — 2675KW<br>TOTAL ELECTRICAL USAGE — 2675KWH (@ 100%)<br>— 2675KWH x 8766HRS = 23,449,050KWH / YR<br>— 23,449,050KWH x $0.0515/KWH = $1,207,626.00<br><br>TOTAL ANNUAL ELECTRICAL COST = $1,207,626.00 | TOTAL QUANTITY OF BURNERS — 118<br>TOTAL NATURAL GAS USAGE<br>— 64 x 0.092MCF / HR = 5.9MCF / HR   (ZONES 14 - 29)<br>— 14 x 0.132MCF / HR = 1.8MCF / HR   (ZONES 1 - 2)<br>— 24 x 0.122MCF / HR = 2.9MCF / HR   (ZONES 3 - 6)<br>— 16 x 0.153MCF / HR = 2.4MCF / HR   (ZONES 30 - 31)<br>— 13.0MCF x 8766HRS = 113,958MCF / YR<br>— 113,958MCF x $3.50/MCF = $398,853.00<br><br>TOTAL ANNUAL NATURAL GAS COST = $398,853.00 |

TOTAL ANNUAL ELECTRICAL COST     = $1,207,626.00
TOTAL ANNUAL NATURAL GAS COST    = $  398,853.00
TOTAL ANNUAL ENERGY SAVINGS      = $  808,773.00

FIGURE 12

| ELECTRICAL EQUIPMENT NO LONGER REQUIRED ||||||||||
|---|---|---|---|---|---|---|---|---|---|
| PRIMARY SIDE |||| SECONDARY SIDE |||||
| ZONE | PWR BUS DUCT (REMOTE) | DISC SWITCH (REMOTE) | CONTACTOR & REACTOR (REMOTE) | TRANS- FORMER 1"~32" | BUS BARS (TOTAL) 35 | BUS BOXES 36 | CONNEC TORS 37 | CABLES 38 | HEATING ELEMENTS 39 |
| 1' | 5 FT | 1 | 1 SET | 1 | 36 FT | 1 | 132 | 356 FT | 20 |
| 2' | 5 FT | 1 | 1 SET | 1 | 60 FT | 1 | 126 | 394 FT | 19 |
| 3' | 5 FT | 1 | 1 SET | 1 | 81 FT | 1 | 144 | 472 FT | 22 |
| 4' | 5 FT | 1 | 1 SET | 1 | 60 FT | 1 | 126 | 356 FT | 19 |
| 5' | 5 FT | 1 | 1 SET | 1 | 36 FT | 1 | 132 | 394 FT | 20 |
| 6' | 5 FT | 1 | 1 SET | 1 | 36 FT | 1 | 132 | 458 FT | 20 |
| 7' | 5 FT | 1 | 1 SET | 1 | 60 FT | 1 | 132 | 512 FT | 20 |
| 8' | 5 FT | 1 | 1 SET | 1 | 60 FT | 1 | 132 | 356 FT | 20 |
| 9' | 5 FT | 1 | 1 SET | 1 | 36 FT | 1 | 132 | 416 FT | 20 |
| 10' | 5 FT | 1 | 1 SET | 1 | 36 FT | 1 | 132 | 494 FT | 20 |
| 11' | 5 FT | 1 | 1 SET | 1 | 60 FT | 1 | 132 | 536 FT | 20 |
| 12' | 5 FT | 1 | 1 SET | 1 | 60 FT | 1 | 132 | 440 FT | 20 |
| 13' | 5 FT | 1 | 1 SET | 1 | 36 FT | 1 | 132 | 500 FT | 20 |
| 14' | 5 FT | 1 | 1 SET | 1 | 36 FT | 1 | 132 | 506 FT | 20 |
| 15' | 5 FT | 1 | 1 SET | 1 | 36 FT | 1 | 132 | 464 FT | 20 |
| 16' | 5 FT | 1 | 1 SET | 1 | 36 FT | 1 | 132 | 440 FT | 20 |
| 17' | 5 FT | 1 | 1 SET | 1 | 36 FT | 1 | 132 | 410 FT | 20 |
| 18' | 5 FT | 1 | 1 SET | 1 | 36 FT | 1 | 132 | 392 FT | 20 |
| 19' | 5 FT | 1 | 1 SET | 1 | 36 FT | 1 | 132 | 356 FT | 20 |
| 20' | 5 FT | 1 | 1 SET | 1 | 36 FT | 1 | 132 | 380 FT | 20 |
| 21' | 5 FT | 1 | 1 SET | 1 | 36 FT | 1 | 132 | 344 FT | 20 |
| 22' | 5 FT | 1 | 1 SET | 1 | 36 FT | 1 | 132 | 362 FT | 20 |
| 23' | 5 FT | 1 | 1 SET | 1 | 36 FT | 1 | 132 | 362 FT | 20 |
| 24' | 5 FT | 1 | 1 SET | 1 | 36 FT | 1 | 132 | 320 FT | 20 |
| 25' | 5 FT | 1 | 1 SET | 1 | 36 FT | 1 | 132 | 320 FT | 20 |
| 26' | 5 FT | 1 | 1 SET | 1 | 36 FT | 1 | 132 | 344 FT | 20 |
| 27' | 5 FT | 1 | 1 SET | 1 | 36 FT | 1 | 132 | 344 FT | 20 |
| 28' | 5 FT | 1 | 1 SET | 1 | 36 FT | 1 | 132 | 320 FT | 20 |
| 29' | 10 FT | 1 | 1 SET | 1 | 36 FT | 1 | 132 | 320 FT | 20 |
| 30' | 10 FT | 1 | 1 SET | 1 | 72 FT | 1 | 318 | 800 FT | 47 |
| 31' | 10 FT | 1 | 1 SET | 1 | 114 FT | 1 | 276 | 760 FT | 40 |
| 32' | 10 FT | 1 | 1 SET | 1 | 72 FT | 1 | 318 | 800 FT | 47 |
| TOTALS | 180 FT | 32 | 32 SETS | 32 | 1,491 FT | 32 | 4,740 | 14,028 FT | 714 |

FIGURE 13

METHOD OF PRODUCING FLAT GLASS

This application is a division of application Ser. No. 08/186,628, filed Jan. 26, 1994 now U.S. Pat. No. 5,427,598 issued Jun. 27, 1995, which is a continuation-in-part of Ser. No. 07/920,399 filed Jul. 27, 1992, now U.S. Pat. No. 5,302,177 issued Apr. 12, 1994.

BACKGROUND OF THE INVENTION

This invention relates generally to the controlled cooling of the molten flat glass ribbon as it passes through the tin float bath at a continuous rate. Manufacturing flat glass comprises the delivering of molten glass to a bath of molten tin and advancing the glass along the surface of the tin under thermal conditions that do not contaminate the internal atmosphere. Such contamination is detrimental to both the glass product and the molten tin. Glass at approximately 1900 degrees F enters the bath from the melting tank and at approximately 1200 degrees F exits the bath to a cooling lehr. In prior art installations the temperatures in the bath are maintained with electrical resistance heaters suspended from the roof over the ribbon of glass. Such electrical heaters do not contaminate the bath atmosphere. The metal plate shell of the prior art bath roof is protected from the heat with an internal refractory lining, which has little or no heat-insulating qualities and isolates the electrical equipment plenum above from the heated cavity. This prior art construction has been used over the past twenty-five year period. Attempts to burn natural gas over the bath by the glass industry failed the industry's contamination requirements.

| Patents | | |
|---|---|---|
| Number | Date | Relationship |
| 3,083,551 | 04.02.63 | Layout of float bath with molten metal |
| 3,332,763 | 07.25.67 | Layout of tin float bath utilizing electrical heating elements |
| 3,486,869 | 12.30.69 | Layout of tin float bath utilizing regular and auxiliary electrical heating elements |

Reference Material (To assist in understanding the presentation)

The Handbook of Glass Manufacture, volume II, 3rd edition, pages 714–2 through 714–21.

The Glass Industry Magazine, April 1980 issue, pages 18,20,22, article "Float Glass Production: Pilkington vs PPG," by Ronald A. McCauley, Rutgers University.

A Review Lecture, "The float glass process,"by L. A. B. Pilkington, delivered Feb. 13, 1949.

Reference Drawings, sheet 1 with FIGS. 1 and 2 and sheet 2 with FIG. 3 showing the existing electrical tin float bath.

Prior art uses electrical heating elements with intricate power supplies, conductors, contactors and controls. The present invention's use of a natural gas system with automatic recuperative burners surpasses the prior art by being more cost-efficient and more energy-efficient, does, not contaminate the bath atmosphere, is more easily installed, minimizes maintenance and shutdown, all of which promotes increased productivity.

SUMMARY OF THE INVENTION

The construction of an entirely new operational roof for the tin float bath comprises two parts, the newly designed fabrication of the bath roof and the use of automatic recuperative natural gas burners instead of the prior art electrical heating elements. Individually, both the new fabrication and gas burners contribute to a cost-efficient operation that highly excels the prior art operation.

The fabrication of the new roof housing utilizes a one-half inch steel plate furnace shell of a required depth to allow the installation of the gas burners in either a horizontal or a vertical position. The interior insulation of the new furnace shell consists of a layered ceramic fiber lining of blanket modules, sold commercially under the trademark "Firewall Bonded 22," and two one-inch thick boards, sold commercially under the trademark. "Fiberfrax Duraboard," type RG, maintaining a temperature differential from 2200 degrees F inside the shell to an approximately 200 degrees F outside the shell. No cooling chamber is required above the new bath enclosure as is necessary to protect the prior art electrical equipment and materials of the prior art tin float bath. Such cooling chamber causes a condensation of tin oxide/tin sulfide on the suspended internal refractory lining which then becomes a contaminate of the glass.

The use of the new automatic recuperative natural gas burners in the tin float bath process will result in the following operational cost advantages. The utilization of natural gas is more cost-efficient than electricity, approximately a conservative seventy percent savings in this case. The new gas burner installation encompasses few moving parts, easy insertion of the burners through the mounting flange even during full operation, only two piping connections for gas and combustion air, and simple HIGH-FIRE, LOW-FIRE, OFF control. Glass production is a twenty-four hour daily operation throughout the mechanical life of the bath. Burned out or broken electrical heaters periodically cause prior art operational adjustments to maintain glass flow until quality is affected and complete shut down then becomes necessary. Any shutdown costs are prohibitive, thousands of dollars per minute. Prior art shutdowns entail stopping the glass flow, cooling the bath, raising the roof, replacing the failed electrical heaters with new, making electrical reconnections, lowering the roof, reheating the bath and again establishing the glass flow in its proper atmosphere. This prior art shutdown encompasses engineering, demolition and installation for a ninety day period during which no glass is produced. With the new automatic recuperative gas burners no shutdown is necessary. Seldom will the gas burners fail. If one does require replacement, it can be readily removed and replaced. This replacement will take approximately two hours, during which time the glass flows continuously with no interruptions. The longevity of the installation is increased substantially because, first, the new burners are capable of withstanding the corrosive nature of tin oxide/tin sulfide and, also, the new layered ceramic fiber lining does not deteriorate.

BRIEF DESCRIPTION OF THE DRAWINGS

FIG. 10 is typical of all zones having four burners. Zones with six, seven or eight burners are provided similarly and from the same gas and air headers. See FIG. 11 for the quantity of burners per zone.

FIG. 11 is a heating conversion chart showing the connected kilowatts, the quantity of the prior art electrical heating elements, the total rated BTU's for each of the prior art thirty-two electrical zones of the prior art tin float bath, the proposed burner zone BTU requirements, the quantity of burners per burner zone, burner information and total BTU's for each of the twenty-four gas burner zones. This chart presents the calculated natural gas requirements to operate the new tin float bath and to determine how cost efficient and energy efficient the new bath is as opposed to the prior art bath. See FIG. 12 for comparative costs.

FIG. 12 is a bath operation cost comparison chart presenting with the total annual cost of operating a prior art bath with electricity and the new bath with natural gas. This does not include the cost savings that will result from the new bath roof with the layered ceramic fiber lining. This savings can be determined only during operation.

FIG. 13 is a chart showing the quantities of the electrical equipment and materials from the prior art tin float bath that will not be included in the installation of the new tin float bath with automatic recuperative gas burners.

DESCRIPTION OF THE PREFERRED EMBODIMENTS

An explanation of the prior art tin float bath must precede the detailed presentation of this invention. In order that this invention may be understood more readily, references to the accompanying figures will be made.

Figure 1:
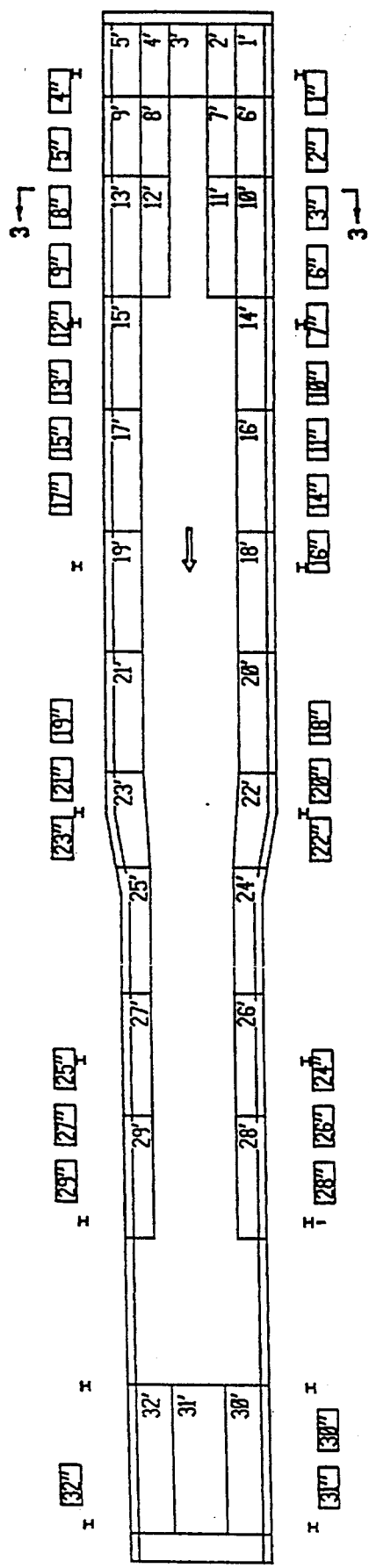
FIG. 1 is a plan view of a prior art tin float bath chamber showing heating zones and electrical heating transformers.

FIG. 1 is a plan view of a prior art typical tin float bath chamber with electrical heating zones numbered 1' through 32' and with the associated zone transformers, numbered 1" through 32". Glass enters the bath from the right and exits from the left.

Figure 2:
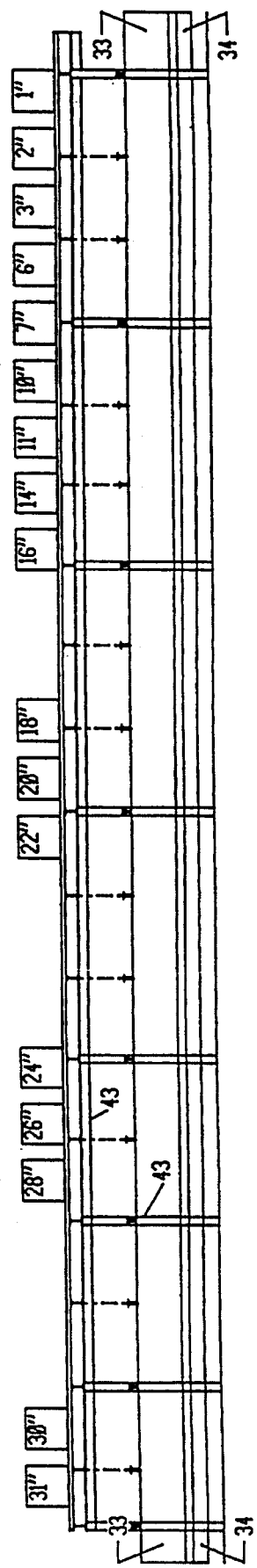
FIG. 2 is a longitudinal elevation of a prior art tin float bath chamber showing the hath roof and the bath bottom and the heating transformers mounted on the roof support structure.

FIG. 2 is a longitudinal elevation of the prior art bath chamber showing the bath roof 33, the bath bottom 34 and the heating transformer locations above.

Figure 3:
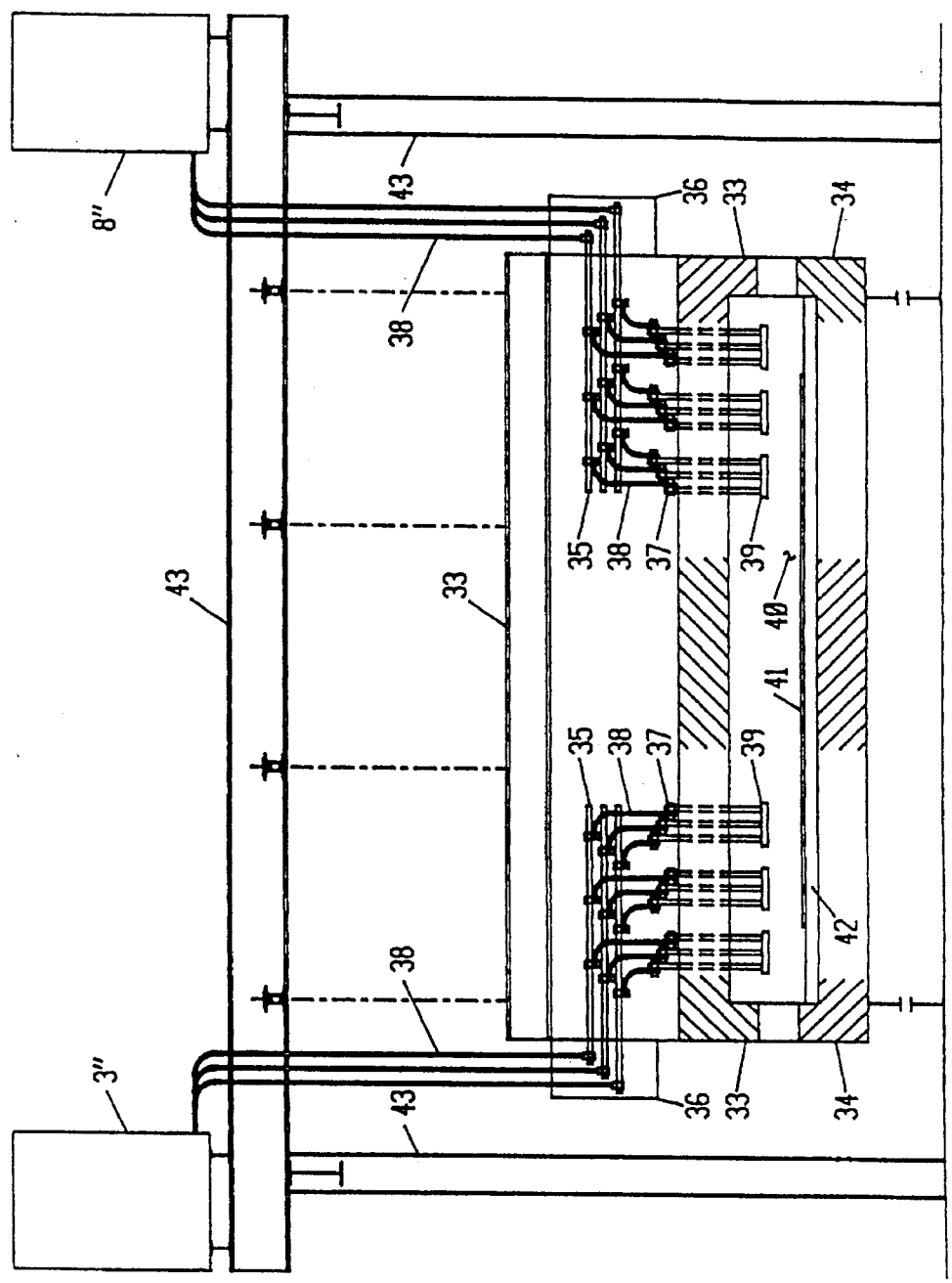
FIG. 3 is a transverse section of a prior art tin float bath chamber taken along line 3—3 of FIG. 1 detailing the electrical materials and equipment. This section is typical throughout the length of the prior art bath.
Figure 6:
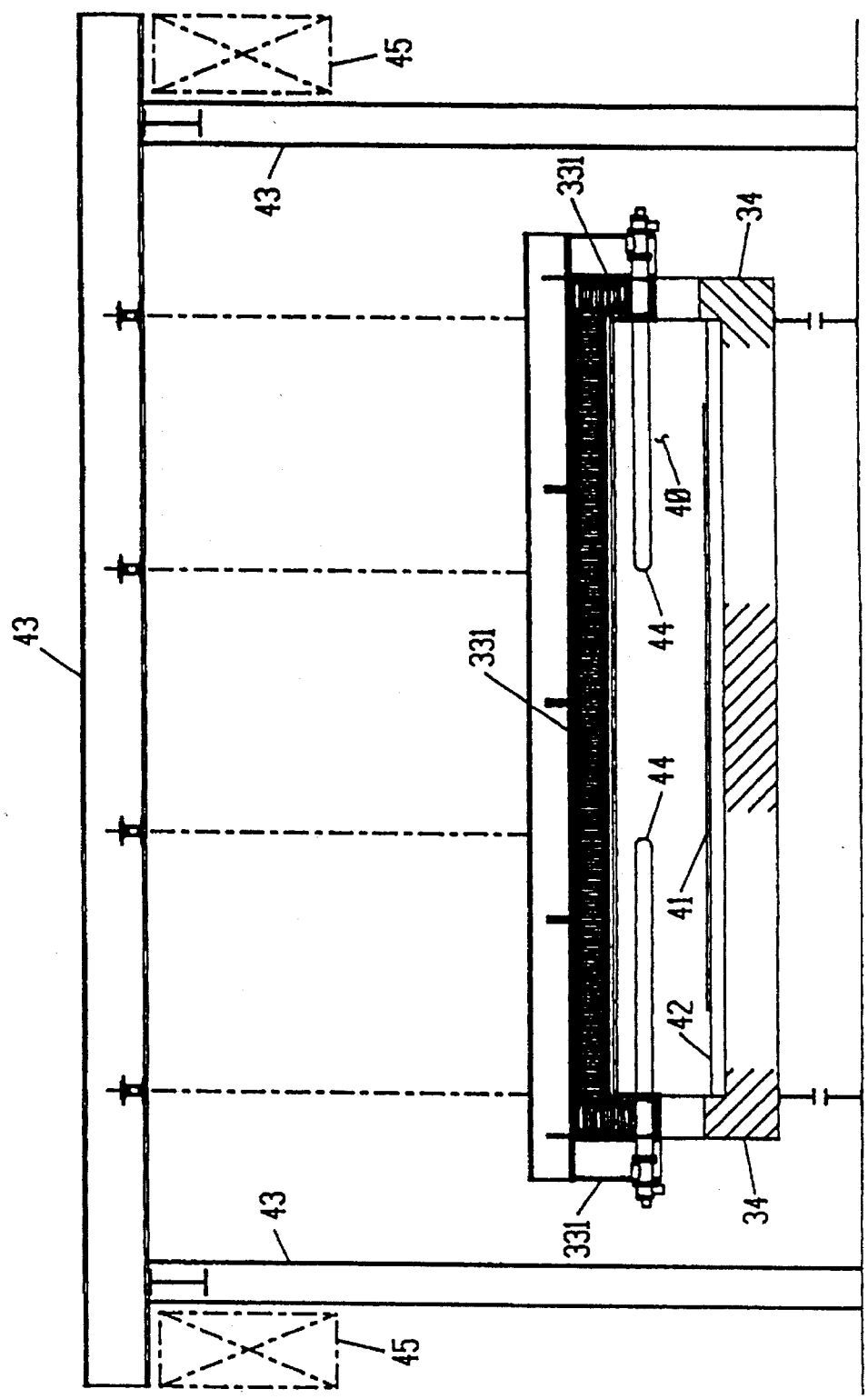
FIG. 6 is a transverse section of the new tin float bath taken at the plan line 6—6 of FIG. 4 showing the absence of the electrical heating materials, equipment and the prior art bath roof, and their replacement with the new bath roof and the new side-mounted natural gas burners.

FIG. 3 is a transverse section taken on the line 3—3 of FIG. 1, detailing the electrical materials internal to the prior art bath roof and consisting of copper bus bars 35 terminating in the bus box 36 and connectors 37. Cables 38 connect bus bars 35 to the electrical heating elements 39 and to the transformers 3" and 8" above. FIG. 3 is typical through the length of the bath. Electrical resistance heaters 39 are shown extended into the bath atmosphere 40 over the glass ribbon 41 floating on the tin 42. The prior art bath roof 33 is suspended separately from the bath bottom 34 by a support structure 43. The prior art bath roof 33 with all of its associated electrical equipment and materials as shown in FIGS. 1, 2 and 3 shall be removed in its entirety and replaced with a new bath roof 331 as shown in FIG. 6. The prior art support structure 43 will remain to support the new bath roof 331. The quantities of electrical items eliminated with the prior art roof are listed on FIG. 13.

Figure 4:
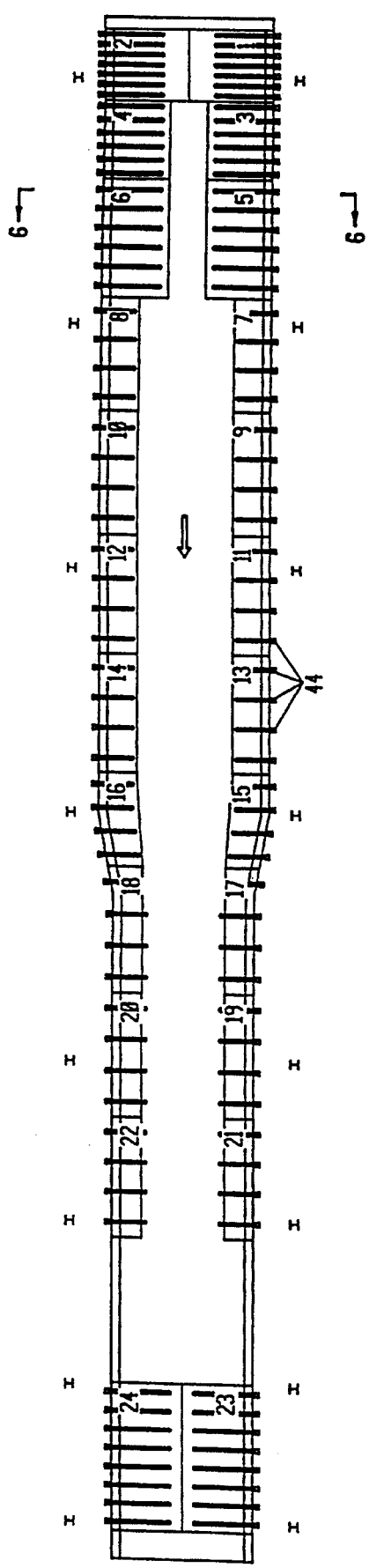
FIG. 4 is a plan view of the new elongated tin float bath chamber showing how the electrical installation and the prior art bath roof of FIG. 1 has been omitted and replaced with the new bath roof and the natural gas burners arranged parallel to each other.

FIG. 4 is a plan view of the new elongated tin float bath chamber showing the locations of one hundred eighteen natural gas burners 44 in their respective heating zones in parallel. Glass enters the bath from the right and exits from the left. The new bath roof 331 is shown on FIG. 5, 6, 7 and 8.

Figure 5:
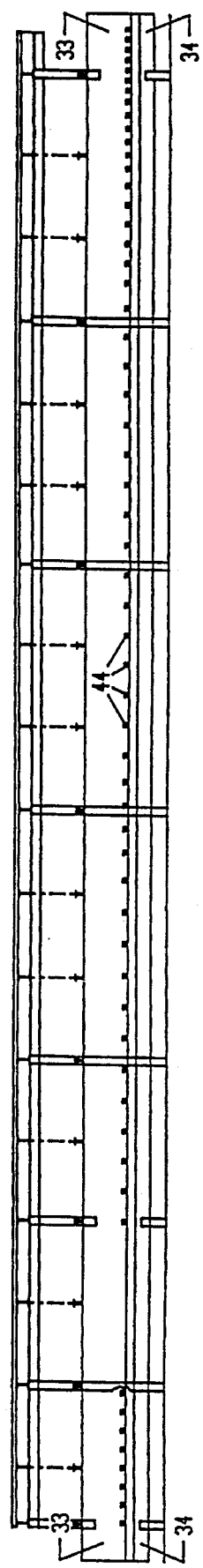
FIG. 5 is a longitudinal elevation of the new tin float bath chamber showing the new side mounted natural gas burners.

FIG. 5 is a longitudinal elevation of the new elongated tin float bath showing the locations of the natural gas burners 44 mounted through the side walls of the new bath roof 331.

FIG. 6 is a transverse section taken along the line 6—6 of FIG. 4 showing the new bath chamber roof 331 which has depending side walls side-mounted natural gas burners 44 are installed horizontally through the depending side walls of roof 331. Space 45 is allocated for both natural gas and combustion air header pipes.

Figure 7:
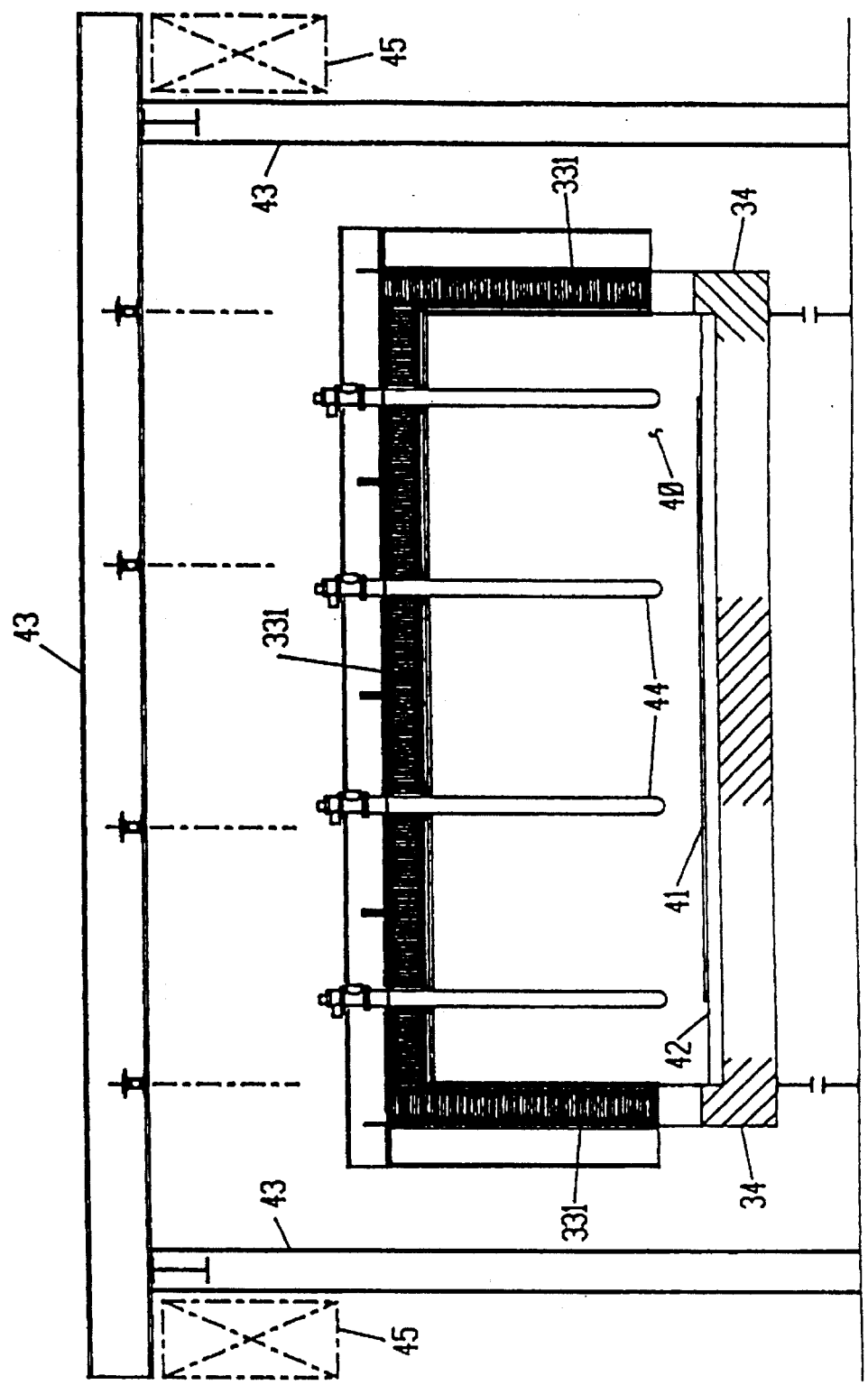
FIG. 7 is similar to FIG. 6 except with top vertical mounted new natural gas burners. Either section or both is typical throughout the length of the new bath.

FIG. 7 shows the natural gas burners 44 installed parallel to each other vertically through the top of the new bath roof 331. Either or both of the horizontal or vertical installations can be utilized and the depth of the new bath roof 331 will be altered accordingly.

Figure 8:
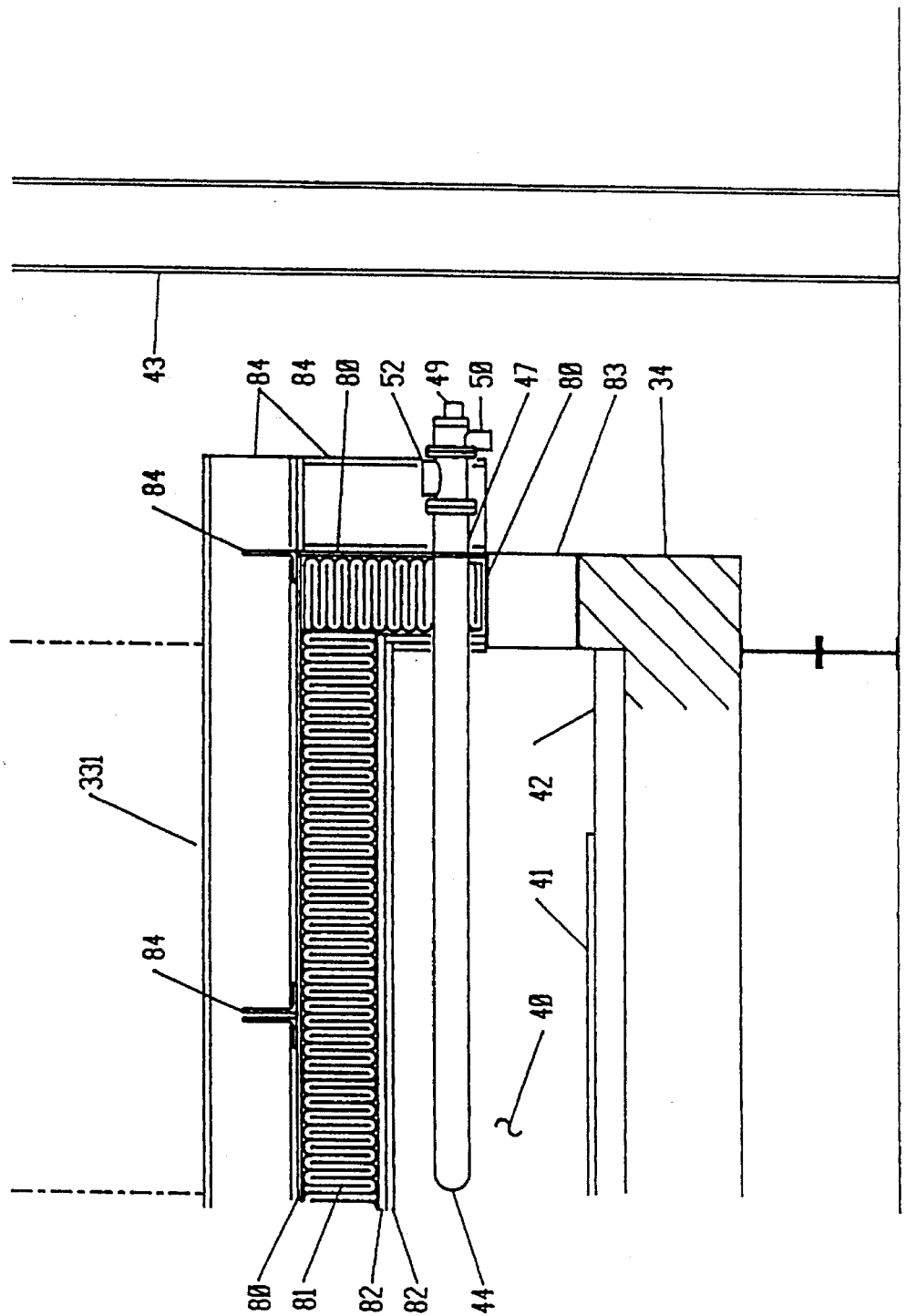
FIG. 8 is a detail of the construction of the new bath roof with sinusoidal layered ceramic fiber blanket lining.

FIG. 8 shows the construction details of the new bath roof 331. The shell 80 of the new bath roof is fabricated of one-half inch plate steel and is made rigid with an I-beam and angle framework 84. The shell 80 and the framework 84 are suspended from the support structure 43. The interior of the shell housing is insulated with sinusoidal layers of ceramic fiber blanket modules 81, sold commercially under the trademark. "Firewall Bonded 22," and two one-inch thick, rigid, high temperature ceramic fiber boards 82, sold commercially under the trademark "Fiberfrax Duraboard," type RG, all as manufactured by The Carborundum Company. This insulation provides the following advantages: lower heat losses, faster heat-up and cool-down cycles, lower installed costs, easy repairs, thermal shock resistance, high heat internal reflectance, good sound absorption, excellent corrosion resistance and longer life of the new bath. Side seal blocks 83 seal the void between the new elongated roof 331 and the present elongated bath bottom 34 to form the complete tin float bath chamber. Items 47, 49, 50 and 52 of the burners 44 are described as part of FIG. 9.

Figure 9:
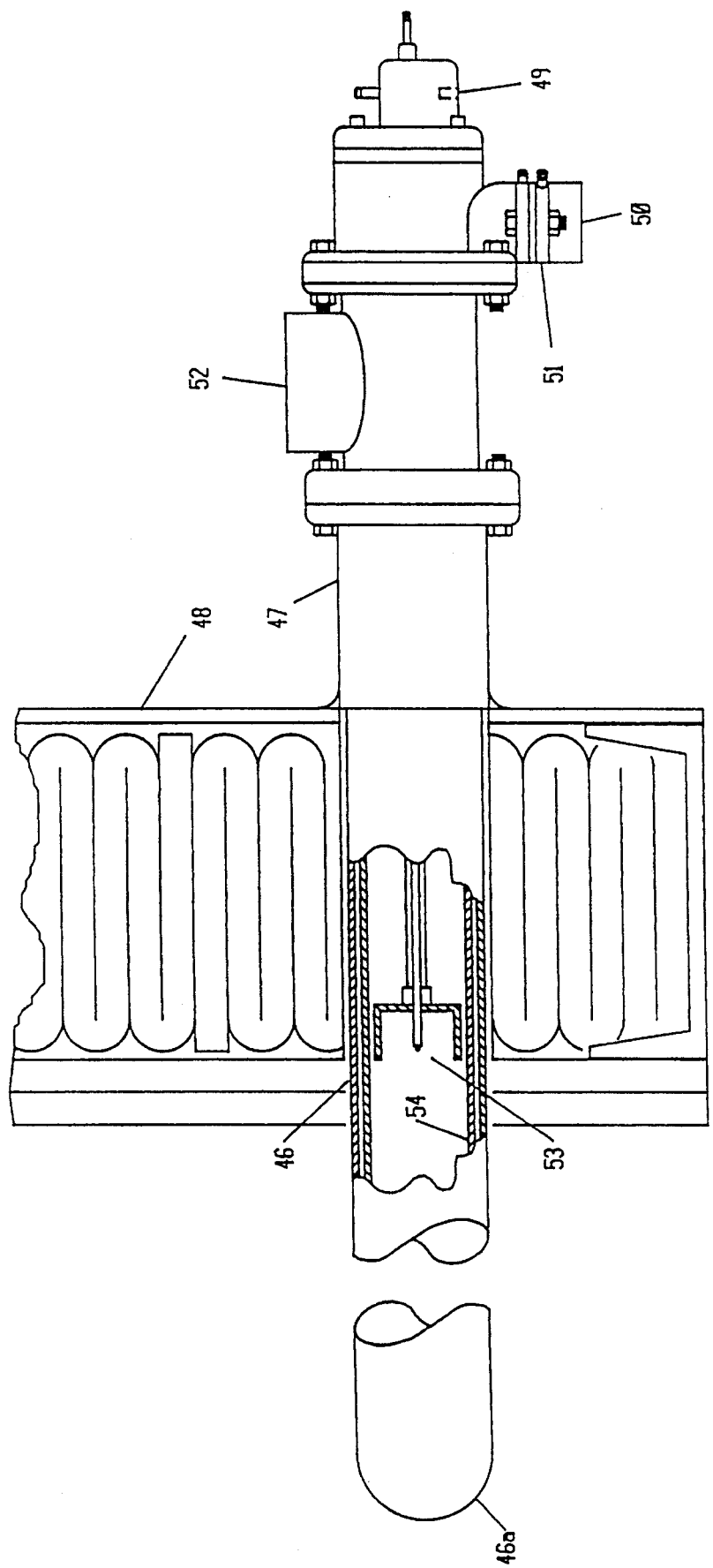
FIG. 9 is a detailed cutaway view of the new automatic recuperative natural gas burner.

FIG. 9 is a cutaway view of the automatic recuperative natural gas burner similar to that as fabricated from FeCrAl alloy known and sold commercially under the trademark "Kanthal APM". by Eclipse Combustion of Rockford IL. Each burner consists of an ignition and heat-radiating chamber body 46 for operation up to 2370 degrees F which encloses the entire burner and has a semi-spherical closed end portion 46a as shown in FIG. 9; a flanged mount 47 welded to the external chamber roof bath steel shell 48, complete with gas inlet 49, air inlet 50, air metering orifice 51, an exhaust outlet 52 and the internals with a burner nozzle 53 within a sleeve 54 coaxial with body 46. This particular burner type is capable of withstanding the corrosive nature of the tin oxide/tin sulfide present in the bath atmosphere.

Figure 10:
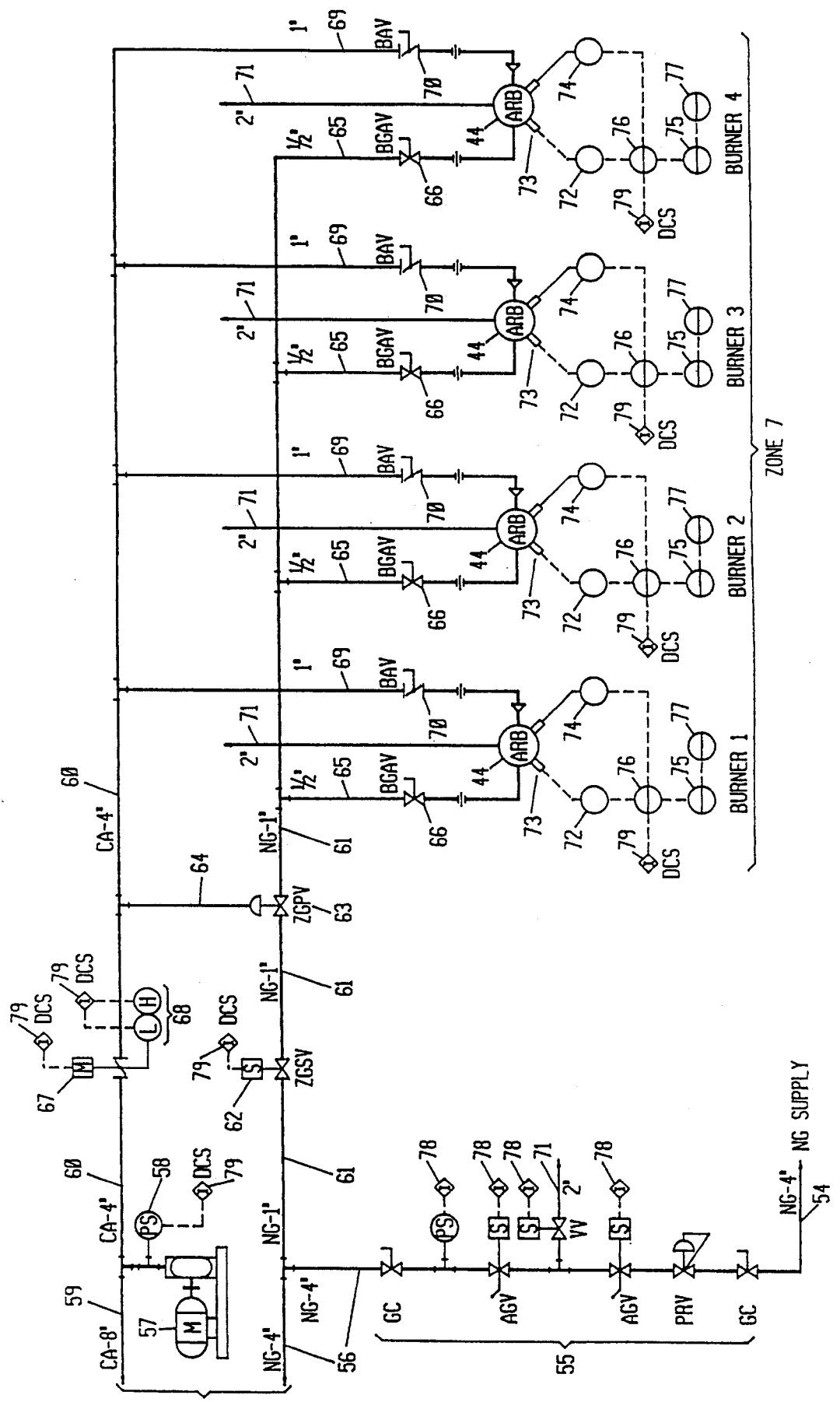
FIG. 10 is a piping and instrumentation diagram showing the natural gas supply pipe with its main gas valve train, the natural gas header pipe, the combustion air blower, the combustion air header pipe, associated valves, and with the requisite taps, adjustable valves, burners and instruments.

The preceding paragraph refers primarily to the preparation of the new bath roof. The remaining equipment, instruments, piping and valves are shown on FIG. 10, a typical piping and instrumentation diagram. The explanation of FIG. 10 will describe the operation for the installation with the horizontal burners. The operation with the vertical burners is similar. A four burner zone 7 is shown. Zones with six, seven and eight burners are similar, differing only in the quantity of burners. Two blowers, the main gas supply with valve train, the control valves and instruments provide combustion air and gas to the gas burners on both sides of the bath.

Natural gas is provided via a four inch gas line 54 to the main gas valve train 55, consisting of: two manual shut-off valves, a pressure regulating valve, two electrically-operated manually-reset shut-off valves with electrical interlocks, a vent valve with an electrical interlock and pressure switch with an electrical interlock. All electrical interlocks 78 are connected to the ignition section of the burner control panel. The four inch natural gas line 56 continues from the main gas valve train as the main gas supply header running along total bath length in allocated space 45, FIG. 6.

Combustion air is provided by a centrifugal blower 57 via an eight inch main air supply header 59. A pressure switch 58 with an electrical interlock 79 is utilized to sense correct air header pressure. This eight inch main air supply header 59 continues along total bath length in space 45, FIG. 6.

The four inch main gas supply header 56 along both sides of the length of the bath is tapped at each burner zone location to form a one inch secondary gas header 61. Located at the beginning of the one inch secondary gas header are two valves. The first is the burner zone secondary gas header ON-OFF solenoid valve 62 with an electrical interlock 79. The second is the burner zone secondary gas header proportionator valve 63 with a proportionator impulse line 64 tapped into the secondary air supply header 60. This proportionator valve is required to maintain the proper natural gas to air ratio required for combustion within the automatic recuperative burner 44. The one inch secondary gas header 61 is continued from the proportionator valve and is tapped with a one-half inch line 65 connected to the zone automatic recuperative burner 44. This line is provided with an adjustable valve 66.

The eight inch main air supply header 59 along both sides of the length of the bath is tapped at each burner zone location to provide a four inch secondary air supply header 60. Located at the beginning of the four inch secondary air supply header is an electrically-operated motor-driven valve 67, which regulates the combustion air flow. The motor-driven valve 67 is provided with a two-position switch 68 which indicates LOW-FIRE or HIGH-FIRE conditions. Both the motor-driven valve and the two-position switch have electrical interlocks 79. The four inch secondary air supply header 60 is continued from the motor-driven valve 67 and is tapped with a one inch air line 69 connected to the zone automatic recuperative burner 44. This line is provided with an adjustable shut-off valve 70.

In addition, the automatic recuperative burner 44 is provided with a two inch exhaust stack 71 to atmosphere. Each automatic recuperative burner is furnished with an ignition system. This system comprises an ignition transformer 72, ignition plug 73 and an ultraviolet flame detector 74. Associated with this system are a timer 75, a relay 76 and an indicating light 77 mounted in the ignition section of the burner control panel. Each zone burner has its respective interlock 79. All 79 interlocks are part of the DCS, Distributive Control System. In each burner 44 combustion air and natural gas are ignited and burned within the heat-radiating chamber 46. The residue from the burnt gases (by-products of combustion of the natural gas) is exhausted externally to the bath and has no contact with the atmosphere inside the bath. As the burnt gases move through the chamber to the exhaust outlet 52, they preheat the incoming gas and air for a more efficient operation.

One burner control panel for the control of both sides of the bath has three functional sections: main valve train control, the burner ignition control and flame monitoring control. The operational status of all burners is indicated at this panel. If one burner fails to ignite, or fails to continue operating, the operating personnel knows immediately the condition and location of that particular burner and will initiate the corrective procedures.

We claim:

1. A method of producing flat glass from molten glass at a temperature of approximately 1900° F. to a solidified temperature of approximately 1200° F. within a chamber containing a molten tin float bath comprising the steps of:

providing an enclosed float bath chamber having its own atmosphere and containing a molten tin float bath;

positioning above said molten tin float bath within said chamber a plurality of enclosed recuperative gas burners having gas inlets, air inlets, and exhaust gas outlets all positioned outside said chamber so that no contamination of the atmosphere, the molten tin and glass within said chamber is caused by gas and air entering said gas inlets and said air inlets nor by exhaust gases exiting through said exhaust gas outlets during operation of said recuperative gas burners;

operating said plurality of recuperative gas burners and controlling the operation of said plurality of recuperative gas burners;

introducing molten glass at a temperature of approximately 1900° F. onto said molten tin float bath in said chamber;

advancing said molten glass along said molten tin float bath in said chamber to produce said flat glass; and removing said flat glass from said chamber when said flat glass is at a temperature of approximately 1200° F.

2. The method of claim 1 wherein said recuperative gas burners burn natural gas.

3. The method of claim 1 wherein said recuperative gas burners comprise bodies formed of an Fe Cr Al alloy.

4. The method of claim 1 wherein individual recuperative gas burners among said plurality of enclosed recuperative gas burners are replaceable while said glass is being produced.

5. A method of producing flat glass from molten glass within a chamber containing a molten tin float bath comprising the steps of:

providing an enclosed float bath chamber having its own atmosphere and containing a molten tin float bath, said chamber having a first opening at one end to introduce molten glass into said chamber to float on said molten tin float bath and a second opening through which said flat glass exits said chamber;

positioning above said molten tin float bath within said chamber a plurality of enclosed recuperative gas burners having gas inlets, air inlets, and exhaust gas outlets all positioned outside said chamber so that no contamination of the atmosphere, the molten tin and glass within said chamber is caused by gas and air entering said gas inlets and said air inlets nor by exhaust gases exiting through said exhaust gas outlets during operation of said recuperative gas burners;

operating said plurality of recuperative gas burners and controlling the operation of said plurality of recuperative gas burners;

introducing molten glass into said chamber through said first opening to float on said molten tin float bath;

advancing said molten glass along said molten tin float bath in said chamber from said first opening toward said second opening to produce said flat glass; and removing said flat glass from said chamber through said second opening.

\* \* \* \* \*